(12) United States Patent
Brothers et al.

(10) Patent No.: US 6,957,702 B2
(45) Date of Patent: Oct. 25, 2005

(54) CEMENT COMPOSITIONS WITH IMPROVED MECHANICAL PROPERTIES AND METHODS OF CEMENTING IN A SUBTERRANEAN FORMATION

(75) Inventors: Lance E. Brothers, Chickasha, OK (US); Robert J. Sepulvado, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 155 days.

(21) Appl. No.: 10/414,641

(22) Filed: Apr. 16, 2003

(65) Prior Publication Data

US 2004/0206501 A1 Oct. 21, 2004

(51) Int. Cl.⁷ .............................................. E21B 33/138
(52) U.S. Cl. ...................................... 166/293; 166/285
(58) Field of Search .......................... 166/285, 292–295

(56) References Cited

U.S. PATENT DOCUMENTS

| | | | |
|---|---|---|---|
| 3,359,225 A | 12/1967 | Weisend | 260/29.6 |
| 4,063,603 A | 12/1977 | Rayborn | 175/65 |
| 4,111,710 A | 9/1978 | Pairaudeau et al. | 106/90 |
| 4,461,644 A | 7/1984 | Childs et al. | 106/76 |
| 4,557,763 A | 12/1985 | George et al. | 106/90 |
| 4,784,223 A | 11/1988 | Worrall et al. | 166/287 |
| 4,927,462 A | 5/1990 | Sugama | 106/99 |
| 5,820,670 A | 10/1998 | Chatterji et al. | 106/727 |
| 6,059,035 A | 5/2000 | Chatterji et al. | 166/293 |
| 6,059,036 A | 5/2000 | Chatterji et al. | 166/294 |
| 6,220,354 B1 | 4/2001 | Chatterji et al. | 166/293 |
| 6,230,804 B1 | 5/2001 | Mueller et al. | 166/293 |
| 6,279,652 B1 | 8/2001 | Chatterji et al. | 166/194 |
| 6,308,777 B2 | 10/2001 | Chatterji et al. | 166/293 |
| 6,386,109 B1 * | 5/2002 | Brooks et al. | 102/306 |
| 6,457,524 B1 | 10/2002 | Roddy | 166/293 |
| 6,458,198 B1 | 10/2002 | Baret et al. | 106/644 |
| 6,500,252 B1 | 12/2002 | Chatterji et al. | 166/644 |
| 6,508,305 B1 | 1/2003 | Brannon et al. | 166/293 |
| 6,516,883 B1 | 2/2003 | Chatterji et al. | 166/293 |
| 6,645,288 B1 | 11/2003 | Dargaud et al. | 106/696 |
| 2002/0157575 A1 | 10/2002 | DiLullo et al. | 106/711 |
| 2004/0045713 A1 * | 3/2004 | Bianchi et al. | 166/293 |

FOREIGN PATENT DOCUMENTS

| | | |
|---|---|---|
| JP | 2000-72517 | 3/2000 |
| VE | 52882 | 2/1992 |
| VE | 52883 | 2/1992 |
| VE | 53935 | 8/1992 |
| VE | 53936 | 8/1992 |

OTHER PUBLICATIONS

Publication entitled "Interfaces and Mechanical Behaviors of Fiber–Reinforced Calcium Phosphate Cement Compositions", by T. Sugama et al.

Prepared for the Geothermal Division U.S. Department of Energy; Department of Applied Science, Jun. 1992, but admitted to be prior art.

Halliburton brochure entitled "CFR–3 Cement Friction Reducer" dated 1999.

Halliburton brochure entitled "CFR–3 Cement Friction Reducer Dispersant" dated 1998.

Halliburton brochure entitled "Spherelite Cement Additive" dated 1999.

Foreign communication from a related counterpart application dated Nov. 12, 2004.

* cited by examiner

Primary Examiner—Zakiya Walker
(74) Attorney, Agent, or Firm—Craig W. Roddy; Baker Botts, L.L.P.

(57) ABSTRACT

Cement compositions having enhanced mechanical properties and comprising microspheres and carbon fibers are provided herein. Methods are provided herein for cementing in a subterranean formation using such cement compositions. The cement compositions comprise a cement material, carbon fibers, microspheres, sufficient water to form a slurry, and optionally other ingredients including an accelerant, a retardant, a surfactant, or the like.

18 Claims, No Drawings

CEMENT COMPOSITIONS WITH IMPROVED MECHANICAL PROPERTIES AND METHODS OF CEMENTING IN A SUBTERRANEAN FORMATION

BACKGROUND OF THE INVENTION

1. Field of the Invention

The present invention relates to subterranean cementing operations, and more particularly, to cement compositions comprising microspheres having improved mechanical properties, processes of preparing such compositions, and methods of using such compositions in subterranean cementing operations.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks in holes in pipe strings, and the like.

Subterranean formations transversed by well bores are often weak and extensively fractured. Accordingly, the loss of circulation of cement during placement is of great concern, and often calls for reducing the density of the cement as much as possible to accordingly reduce the hydrostatic pressure. A traditional means of reducing the density of the cement has been to increase the cement's water content, because, generally speaking, the higher the water content, the lighter the cement. However, this method may be problematic because the resultant cement often lacks the desired strength, especially in light of the stresses to which the cement will be subjected.

Cement compositions containing lightweight spherical or substantially spherical compounds have been developed as an alternative means of reducing the density of a given cement composition. Some compositions comprise microspheres, which typically comprise cenospheres, glass hollow microspheres, or ceramic hollow microspheres. Cenospheres are hollow spheres primarily comprising silica ($SiO_2$) and alumina ($Al_2O_3$), and are filled with gas. These are a naturally occurring by-product of the burning process of a coal-fired power plant. The addition of conventional glass hollow microspheres and ceramic hollow microspheres reduces the density of the cement composition and produces a lightweight cement composition, e.g., a cement composition having a density less than about 13 pound per gal.

Cement failures can be particularly problematic in lightweight cement compositions containing a high proportion of microspheres, as these compositions have demonstrably reduced strength. This problematic reduction in strength is believed to be attributable to the combination of reduced content of cementitious materials and increased void space, both of which are caused by the addition of the hollow microspheres to the cement composition. Failure of cement within the well bore can result in radial or circumferential cracking of the cement as well as a breakdown of the bonds between the cement and the pipe or between the cement sheath and the surrounding subterranean formations. Such failures can result in at least lost production, environmental pollution, hazardous rig operations, and/or hazardous production operations. Another undesirable result is the presence of pressure at the well head in the form of trapped gas between casing strings.

To successfully meet the subterranean challenges to which a cement composition may be exposed, a low-density cement composition must develop high bond strength after setting and also have sufficient elasticity and ductility to resist loss of pipe or formation bonding, cracking and/or shattering as a result of all of the stressful conditions that may plague the well, including impacts and/or shocks generated by drilling and other well operations.

SUMMARY OF THE INVENTION

The present invention provides cement compositions having enhanced mechanical properties and comprising microspheres and carbon fibers, and methods for cementing in a subterranean formation using such cement compositions.

One method of the present invention comprises providing a cement composition that comprises microspheres and carbon fibers; placing this cement composition in a subterranean formation; and allowing the cement composition to set therein.

One embodiment of the cement compositions of the present invention involves addition of carbon fibers to a cement composition comprising microspheres. Optionally, other additives suitable for cement compositions such as retardants, accelerants, fluid loss agents, and the like may be added to the cement compositions of the present invention.

The objects, features and advantages of the present invention will be readily apparent to those skilled in the art upon a reading of the description of the preferred embodiments which follows.

DETAILED DESCRIPTION OF PREFERRED EMBODIMENTS

The present invention provides cement compositions having improved mechanical properties, including tensile strength, and methods of utilizing these cement compositions in subterranean cementing operations. While the compositions and methods are useful in a variety of subterranean applications, they are particularly useful in well completion and remedial operations, including primary cementing, e.g., cementing casings and liners in well bores, including those in multi-lateral subterranean wells.

The improved cement compositions of the present invention generally comprise a hydraulic cement, carbon fibers, microspheres, and water sufficient to form a pumpable slurry. The cement compositions of the present invention generally have a density in the range of from about 5 lb/gal to about 15 lb/gal, more preferably in the range of from about 6 lb/gal to about 14 lb/gal. Other additives suitable for use in subterranean cementing operations also may be added to those compositions if desired.

Any cement suitable for use in subterranean cementing operations may be used in accordance with the present invention. In one embodiment, the cement compositions comprise a hydraulic cement. A variety of hydraulic cements are suitable for use in the compositions and methods of the present invention including those comprised of calcium, aluminum, silicon, oxygen, and/or sulfur, which set and harden by reaction with water. Such hydraulic cements include but are not limited to, Portland cements, pozzolana cements, gypsum cements, high alumina content cements, silica cements, and high alkalinity cements.

The water utilized in the cement compositions can be fresh water, salt water (e.g., water containing one or more salts dissolved therein), brine, or seawater. Generally, the water can be from any source provided that it does not contain an excess of compounds that may adversely affect other components in the cement composition. The water may be present in an amount sufficient to form a pumpable slurry. Generally, the water is present in the cement compositions in an amount in the range of from about 50% to about 350% by weight of cement ("bwoc") therein. In some embodiments, the water is present in the cement compositions in an amount in the range of from about 60% to about 200% bwoc therein.

The microspheres that may be used in the cement compositions of the present invention may be any microsphere suitable for use in subterranean applications to, inter alia, reduce the density of the cement composition. As referred to herein, the term "microspheres" will be understood to mean any body having a low specific gravity as compared with a conventional filler, such that when used as a filler in a cement composition, they contribute to reducing the weight of the cement composition. In some embodiments of the cement compositions of the present invention, the microspheres utilized are synthetic, non-porous microspheres. The microspheres may be obtained from any suitable source. Particularly suitable microspheres are cenospheres, which are hollow microspheres that are formed as an industrial waste by-product, and which are commercially available from, for example, Halliburton Energy Services, Inc., of Duncan, Okla., under the tradename "SPHERELITE." Generally speaking, the microspheres are present in the cement compositions in the amount of from about 10% bwoc to about 390% bwoc. In some embodiments, the microspheres are present in an amount in the range of from about 20% bwoc to about 100% bwoc. The microspheres may be added to the cement composition by any suitable method including by dry blending with the cement before the addition of a fluid such as water, by mixing with the fluid to be added to the cement, or by mixing with the cement slurry consecutively with or after the addition of the fluid. The microspheres may be pre-suspended in water and injected into the cement mix fluid or into the cement slurry as an aqueous slurry. Preferably, the microspheres are dry blended with the cement before the addition of water.

It has been found that adding microspheres to a cement composition affects the mechanical properties of the cement composition, inter alia, by lowering the cement composition's density. However, when microspheres are added in quantities sufficient to desirably affect the density of the cement, the mechanical properties of the cement are also affected, e.g., its tensile strength. The reduction in tensile strength can be particularly problematic because the risk of rupture of the cement sheath in response to a stressful condition is directly linked to the tensile strength of the cement. Moreover, the risk is attenuated when the ratio of the tensile strength of the cement to its Young's Modulus is increased. Thus, adding carbon fibers to a cement composition that comprises microspheres is desirable to enhance the mechanical properties including the tensile strength of such cement compositions. Also, adding carbon fibers as opposed to other additives, such as polypropylene, has the added benefit of providing increased temperature stability to the cement composition. This makes the cement compositions of the present invention especially suitable for use in or in conjunction with hostile well bore conditions, such as high temperatures and/or high pressures.

The carbon fibers that are present in the cement compositions of the present invention preferably have a relatively high tensile strength and/or a relatively high tensile modulus. In certain embodiments, to achieve certain of the advantages associated with the present invention, the tensile modulus of the fibers exceeds 180 GPa, and the tensile strength of the fibers may exceed 3000 MPa. The fibers preferably have a mean length of about 1 mm or less. In certain embodiments, the mean length of the carbon fibers is from about 50 to about 500 microns. Most preferably, the fibers have a mean length in the range of about 100 to about 200 microns. Preferably, they are milled carbon fibers. An example of suitable carbon fibers includes "AGM-94" carbon fibers commercially available from Asbury Graphite Mills, Inc., of Asbury, N.J. AGM-94 fibers have a mean length of about 150 microns and a diameter of about 7.2 microns. Another example of suitable carbon fibers includes the "AGM-99" carbon fibers, also available from Asbury Graphite Mills, Inc., which have a mean length of about 150 microns and a diameter of about 7.4 microns. In some embodiments, the carbon fibers are present in the cement compositions in an amount in the range of from about 1% bwoc to about 15% bwoc.

Additional additives may be added to the cement composition as deemed appropriate by one skilled in the art for improving or changing the properties of the ensuing hardened cement. Examples of such additives include but are not limited to, inter alia, fluid loss control additives, defoamers, surfactants, vitrified shale, mica, fiber, fly ash, bentonite, fumed silica, salts, dispersing agents, set accelerators, formation conditioning agents, and set retarders. An example of a suitable dispersing agent is a water-soluble polymer prepared by the caustic catalyzed condensation of formaldehyde with acetone wherein the polymer contains sodium sulfate groups. Such dispersing agent is commercially available under the trade designation "CFR-3" from Halliburton Energy Services of Duncan, Okla. Another suitable dispersant is commercially available under the trade designation "CFR-2" from Halliburton Energy Services in Duncan, Okla.

An example of a preferred cement composition of the present invention comprises: Class G Portland cement; 98% sea water bwoc; 1% CFR-3 dispersant bwoc; 55% hollow microspheres bwoc; and 10% milled carbon fibers bwoc having a mean length of 150 microns.

A preferred method of the present invention comprises providing a cement composition that comprises hollow microspheres and carbon fibers; placing this cement composition in a subterranean formation; and allowing the cement composition to set therein.

To facilitate a better understanding of the present invention, the following examples of some of the preferred embodiments are given. In no way should such examples be read to limit the scope of the invention.

EXAMPLE 1

Test samples of preferred exemplary embodiments of the cement compositions of the present invention were made and the tensile strength of each composition was determined. Comparative samples were also made and similarly tested. To prepare the samples of the cement compositions, Class G Portland cement was mixed with 98% sea water bwoc and 55% SPHERELITE bwoc, and cured for 72 hours at 150° F. To certain sample cement compositions, 1% CFR-3 dispersant bwoc and carbon fibers were added in chosen ratios as described in Table 1. The carbon fibers were milled fibers, specifically AGM-94 fibers from Asbury Graphite Mills Inc., with a mean length of 150 microns and a diameter of 7.2 microns. The tensile strength of each cement composition was then determined. All tests were performed in accordance with ASTM C496-96.

Table 1 below lists the percentage of carbon fibers that were added to each cement composition and the resultant tensile strength.

TABLE 1

| Sample Description | Dispersant (bwoc) | Milled Carbon Fibers (bwoc) | Tensile Strength (psi) |
|---|---|---|---|
| Comparative Sample No. 1 | None | 0 | 183 |
| Sample No. 2 | 1% CFR-3 | 10% | 283 |

Comparative Sample No. 1 illustrates the tensile strength of a cement composition comprising microspheres when no carbon fibers have been added to the composition. The tensile strength was 183 psi.

Sample No. 2 illustrates the tensile strength of a cement composition of the present invention, comprising microspheres to which carbon fibers and a dispersant have been added. The tensile strength was 283 psi, a 55% increase from Comparative Sample No. 1.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean formation comprising the steps of:
   preparing a cement composition comprising a hydraulic cement, water, microspheres, and carbon fibers, wherein the carbon fibers are present in the cement composition in an amount in the range of from about 1% to about 15% by weight of cement;
   placing the cement composition in the subterranean formation; and
   allowing the cement composition to set therein.

2. The method of claim 1 wherein the hydraulic cement comprises at least one of the following: Portland cements, pozzolana cements, gypsum cements, high alumina content cements, calcium phosphate cements, silica cements and high alkalinity cements.

3. The method of claim 1 wherein the carbon fibers have a mean length of about 150 microns.

4. The method of claim 1 wherein the cement composition further comprises at least one of the following: a dispersant, a retardant, an accelerant, a surfactant, a fluid loss agent, bentonite, fumed silica, fiber, mica, and a salt.

5. The method of claim 1 wherein the cement composition has a tensile strength greater than about 183 psi.

6. The method of claim 1 wherein the microspheres are present in the cement composition in an amount in the range of from about 10% to about 390% by weight of cement.

7. The method of claim 1 wherein the water is present in the cement composition in an amount in the range of from about 50% to about 350% by weight of cement.

8. The method of claim 1 wherein the density of the cement composition is in the range of from about 5 pounds per gallon to about 15 pounds per gallon.

9. The method of claim 1 wherein the density of the cement composition is in the range of from about 6 pounds per gallon to about 14 pounds per gallon, wherein the water is present in the cement composition in the range of from about 60% to about 200% by weight of cement, wherein the carbon fibers have a mean length of about 150 microns, and wherein the microspheres are present in the cement composition in an amount in the range of from about 20% to about 100% by weight of cement.

10. A method of increasing the tensile strength of a subterranean formation cement composition comprising a hydraulic cement, microspheres and water, comprising the step of adding carbon fibers to the cement composition, wherein the carbon fibers are added to the cement composition in an amount in the range of from about 1% to about 15% by weight of cement.

11. The method of claim 10 wherein the cement composition comprises at least one of the following: Portland cements, pozzolana cements, gypsum cements, high alumina content cements, calcium phosphate cements, silica cements and high alkalinity cements.

12. The method of claim 10 wherein the carbon fibers have a mean length of about 150 microns.

13. The method of claim 10 wherein the cement composition further comprises at least one of the following: a dispersant, a surfactant or mixture of surfactants, a retardant, an accelerant, a fluid loss agent, bentonite, fumed silica, mica, fiber, and a salt.

14. The method of claim 10 wherein the cement composition has a tensile strength greater than about 183 psi.

15. The method of claim 10 wherein the microspheres are present in the cement composition in an amount in the range of from about 10% to about 390% by weight of cement.

16. The method of claim 10 wherein the water is present in the cement composition in an amount in the range of from about 50% to about 350% by weight of cement.

17. The method of claim 10 wherein the density of the cement composition is in the range of from about 5 pounds per gallon to about 15 pounds per gallon.

18. The method of claim 10 wherein the density of the cement composition is in the range of from about 6 pounds per gallon to about 14 pounds per gallon, wherein the water is present in the cement composition in an amount in the range of from about 60% to about 200% by weight of cement, wherein the carbon fibers have a mean length of about 150 microns, and wherein the microspheres are present in the cement composition in an amount in the range of from about 20% to about 100% by weight of cement.

* * * * *